(12) United States Patent
Takushima et al.

(10) Patent No.: US 6,823,106 B2
(45) Date of Patent: Nov. 23, 2004

(54) OPTICAL MULTIPLEXER/DEMULTIPLEXER AND ADJUSTMENT METHOD THEREOF

(75) Inventors: Michiko Takushima, Yokohama (JP); Hiroshi Suganuma, Yokohama (JP); Tomomi Sano, Yokohama (JP); Masakazu Shigehara, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 128 days.

(21) Appl. No.: 10/260,404

(22) Filed: Oct. 1, 2002

(65) Prior Publication Data

US 2003/0063385 A1 Apr. 3, 2003

(30) Foreign Application Priority Data

Oct. 2, 2001 (JP) ...................... P2001-306596

(51) Int. Cl.[7] .................................................. G02B 6/28
(52) U.S. Cl. ............................. 385/24; 385/31; 385/37; 385/100; 385/121
(58) Field of Search .......................... 385/24, 10, 31, 385/37, 100, 121

(56) References Cited

U.S. PATENT DOCUMENTS

| | | | |
|---|---|---|---|
| 5,594,744 A | | 1/1997 | Lefevre et al. |
| 5,805,759 A | * | 9/1998 | Fukushima ................. 385/140 |
| 5,917,625 A | | 6/1999 | Ogusu et al. |
| 6,111,996 A | * | 8/2000 | Thompson ................... 385/24 |
| 6,188,705 B1 | * | 2/2001 | Krainak et al. ............... 372/32 |
| 6,363,202 B1 | * | 3/2002 | Goodfellow ................ 385/140 |
| 6,396,977 B1 | * | 5/2002 | Dragone ...................... 385/24 |
| 6,421,481 B1 | * | 7/2002 | Sappey ......................... 385/37 |
| 6,483,618 B2 | * | 11/2002 | Amin et al. .................. 398/87 |
| 2001/0028759 A1 | * | 10/2001 | Cao ............................. 385/24 |
| 2002/0094154 A1 | * | 7/2002 | Thibault et al. .............. 385/24 |
| 2002/0181882 A1 | * | 12/2002 | Hibbs-Brenner et al. ..... 385/52 |
| 2003/0156790 A1 | * | 8/2003 | Shlozaki et al. ............. 385/37 |

FOREIGN PATENT DOCUMENTS

| | | |
|---|---|---|
| EP | 1 030 195 A1 | 8/2000 |
| EP | 1 031 825 A1 | 8/2000 |
| JP | 07-77627 | 3/1995 |

OTHER PUBLICATIONS

G.R. Chamberlin et al., "Designs for high channel density single–mode wavelength–division–multiplexers", Proceedings of the SPIE, Bellingham, VA, US, vol. 839, Aug. 17, 1987, pp. 60–66, XP000603504.

* cited by examiner

Primary Examiner—Jared J. Fureman
Assistant Examiner—Allyson N. Trail
(74) Attorney, Agent, or Firm—McDermott Will & Emery LLP

(57) ABSTRACT

The present invention relates to an optical multiplexer/demultiplexer. In the multiplexer/demultiplexer, a first grating receives to diffract a multi-wavelength light signal from a first port into light signals with different wavelengths. A second grating diffracts these light signals towards second ports. The second grating is disposed parallel with the first grating. The second grating has the same grating interval and grating direction as the first grating. The light signals diffracted by the second grating travel parallel with each other. Therefore, the light signals can efficiently enter the second ports without sophisticated lens design and adjustment of the optical system.

20 Claims, 10 Drawing Sheets

OPTICAL MULTIPLEXER/DEMULTIPLEXER AND ADJUSTMENT METHOD THEREOF

BACKGROUND OF THE INVENTION

1. Field of the Invention

The present invention relates to an optical multiplexer/demultiplexer for multiplexing or demultiplexing light with different wavelengths.

2. Related Background Art

An optical multiplexer/demultiplexer combines light signals with different wavelengths into one multi-wavelength light signal, or separates one multi-wavelength light signal into light signals with different wavelengths. The optical multiplexer/demultiplexer is an indispensable optical component for a WDM (Wavelength Division Multiplexing) transmission system for transmitting multi-wavelength signals. In a WDM transmission system, light signals to be transmitted by one optical fiber transmission line are multiplexed by an optical multiplexer at the optical transmitter side, and the multiplexed light signal is demultiplexed by an optical demultiplexer at the optical receiver side.

For such an optical multiplexer/demultiplexer, an optical multiplexer/demultiplexer, which includes an AWG (Arrayed Waveguide Grating) or a reflection grating, can be used. While an AWG is expensive, a reflection grating is superb in mass production, and is relatively inexpensive. This is because many replicas can be easily created from one shape of a grating. Therefore, recently optical multiplexers/demultiplexers which include a reflection grating are being commercialized.

For example, the optical multiplexer/demultiplexer disclosed in Japanese Patent Laid-Open No. 7-77627 comprises a plurality of optical waveguides formed on a planar substrate, a reflection grating and a lens. In the optical multiplexer/demultiplexer, the lens is disposed between the end faces of the optical waveguides and the grating. If a multi-wavelength light signal enters one of the optical waveguides, the light signal is emitted from the end face of the optical waveguide. The light signal reaches the grating through the lens. The wavelength components of the light signal are diffracted by the grating at angles according to the wavelengths. These wavelength components enter the lens at different angles from one another, and individually enter the end faces of the other optical waveguides. Thus, the multi-wavelength light signal is demultiplexed into light signals with different wavelengths. In the reverse propagation path, light signals with different wavelengths are multiplexed into a multi-wavelength light signal.

In the optical multiplexer/demultiplexer disclosed in the above publication, light signals with different wavelengths diffracted by grating travel in the different directions. Therefore, in order to efficiently send light signals with different wavelengths into the end faces of the corresponding waveguides, sophisticated lens design and adjustment of the optical system are required.

SUMMARY OF THE INVENTION

It is an object of the present invention to provide an optical multiplexer/demultiplexer which can multiplex/demultiplex light efficiently and which can be manufactured at low cost.

An optical multiplexer/demultiplexer according to the present invention comprises a first port, one or more second ports, and first and second diffraction gratings. The first grating receives and diffracts light from the first port. The second grating diffracts the light diffracted by the first grating to direct the light to the one or more second ports. The second grating is disposed parallel with the first grating. The second grating may have a diffraction surface parallel with a diffraction surface of the first grating. The second grating has the same grating interval and grating direction as the first grating. The multiplexer/demultiplexer demultiplexes a multi-wavelength light signal incident on the first port into light signals with different wavelengths, and outputs at least one of the light signals through the one or more second ports.

The multi-wavelength light signal incident on the first port is diffracted by the first grating at diffraction angles according to the wavelengths to form the light signals with different wavelengths. The light signals are diffracted again by the second grating at diffraction angles according to the wavelengths. The first and second gratings are disposed parallel with each other, and both have the same grating interval and grating direction. Therefore, the light signals with different wavelengths diffracted by the second grating travel parallel with each other. Thus, the optical multiplexer/demultiplexer can send the light signals easily and efficiently to the corresponding second ports without sophisticated lens design and adjustment of the optical system. Furthermore, in the optical multiplexer/demultiplexer, the grating, whose replicas can be made at low cost, is used rather than an expensive AWG. Consequently, the optical multiplexer/demultiplexer can be manufactured at low cost.

The optical multiplexer/demultiplexer may comprise a plurality of second ports. In this case, the optical multiplexer/demultiplexer may multiplex light signals with different wavelengths incident on the second ports into a multi-wavelength light signal, and output the multi-wavelength light signal through the first port.

A mirror parallel with the first grating may be disposed on an optical path between the first and second gratings. In this case, the light incident on the first port is diffracted by the first grating, reflected by the mirror, and then diffracted again by the second grating. The first and second gratings may be integrated together. In this case, the optical system can be adjusted more easily. It is preferable that the reflectance of the mirror is 90% or more at a working wavelength band. In this case, loss in the transmission band may be small.

The optical multiplexer/demultiplexer may further comprise a first lens and one or more second lenses. The first lens may be disposed on an optical path between the first port and first grating. The first lens has an optical axis forming an angle $\theta_0$ with the perpendicular of a diffraction surface of the first grating. The one or more second lenses may be disposed on optical paths between the second grating and the one or more second ports. The one or more second lenses have optical axes forming the angle $\theta_0$ with the perpendicular of a diffraction surface of the second grating. In this case, multiplexing and demultiplexing are performed very efficiently.

It is preferable that $f_1 \cdot NA_1 < f_2 \cdot NA_2$ is satisfied where a focal distance of the first lens is $f_1$, a numerical aperture of a first optical waveguide to be coupled with the first lens is $NA_1$, a focal distance of each second lens is $f_2$, and a numerical aperture of each of one or more second optical waveguides to be coupled with the one or more second lenses is $NA_2$. In this case, the transmission wavelength spectrum of light to be transmitted becomes wide and flat.

A slit device may be disposed between the one or more second lenses and second grating. The slit device includes one or more slits arranged on optical axes of the one or more second lenses. When the width of each slit along a direction perpendicular to both the optical axes of the one or more second lenses and grating direction of the second grating is S, the formula $S<2\cdot f_2\cdot NA_2$ is satisfied. In this case, the transmission wavelength spectrum of light to be transmitted becomes wide and flat. It is preferable that the slit width S is variable. In this case, a multiplexing/demultiplexing characteristic of the optical multiplexer/demultiplexer can be adjusted by modulating the slit width S.

It is preferable that an optical path length between the first and second gratings is variable. In this case, the multiplexing/demultiplexing characteristic of the optical multiplexer/demultiplexer can be adjusted by modulating the optical path length.

The optical multiplexer/demultiplexer may further comprise a polarization separating element, polarization plane paralleling means, polarization plane orthogonalizing means, and polarization combining element. The polarization separating element polarizes and separates the light from the first port into a first light polarized in a first direction and a second light polarized in a second direction. The first direction is parallel with the grating direction of the first grating. The second direction is perpendicular to the first direction. The polarization plane paralleling means receives the first and second light from the polarization separating element. The polarization plane paralleling means rotates at least one of polarization planes of the first and second light to match polarization directions thereof, and directs the first and second light to the first grating. The polarization plane orthogonalizing means receives the first and second light from the second grating. The polarization plane orthogonalizing means rotates at least one of the polarization planes of the first and second light to orthogonalize the polarization directions thereof. The polarization combining element receives the first and second light from the polarization plane orthogonalizing means to polarize and combine the first and second light, and sends the combined light to the one or more second ports. In this case, the polarization status of the light incident on the first and second gratings is constant regardless of the polarization status of the light incident on the first port. Therefore, a stable transmission characteristic can be obtained.

The polarization plane paralleling means may rotate the polarization plane of the second light by 90° so that the second light becomes polarized in the first direction. In this case, the first and second gratings can diffract incident light at high efficiency, so that the optical loss of the optical multiplexer/demultiplexer becomes small.

It is preferable that the optical path of the first light and the optical path of the second light are shifted in the grating direction of the first grating between the polarization plane paralleling means and the polarization plane orthogonalizing means. In this case, restriction in arranging the polarization plane orthogonalizing means and the polarization plane combining element is relaxed.

The present invention will become more fully understood from the detailed description given hereinbelow and the accompanying drawings 0which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
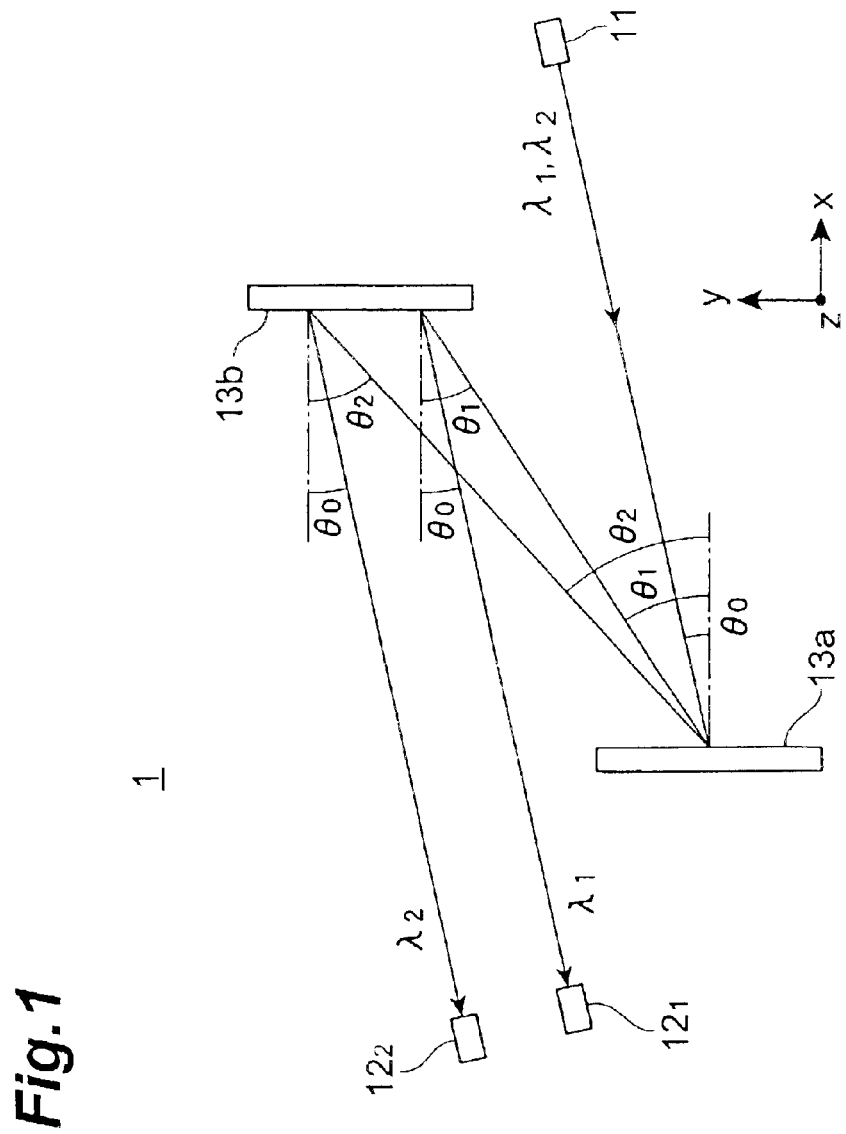
FIG. 1 is a diagram showing the configuration of an optical multiplexer/demultiplexer in accordance with the first embodiment.

Embodiments of the present invention will now be described with reference to the accompanying drawings. To facilitate understanding, identical reference numerals have been used, where possible, to designate identical or equivalent elements that are common to the figures without repeating their overlapping descriptions.

First Embodiment

The first embodiment of the optical multiplexer/demultiplexer according to the present invention will now be described. FIG. 1 is a diagram showing the configuration of the optical multiplexer/demultiplexer 1 according to the first embodiment. In FIG. 1, the xyz rectangular coordinate system is also shown to assist description.

When the optical multiplexer/demultiplexer 1 operates as an optical demultiplexer, the multiplexer/demultiplexer 1 demultiplexes a multi-wavelength light signal that is input to a port 11 into a plurality of light signals with different wavelengths. For example, when the multi-wavelength light signal includes wavelengths $\lambda_1$ and $\lambda_2$, the multiplexer/demultiplexer 1 separates the multi-wavelength signal into a signal of wavelength $\lambda_1$ and signal of wavelength $\lambda_2$, and then outputs the signal of $\lambda_1$ through a port $12_1$ and signal of $\lambda_2$ through a port $12_2$. When the multiplexer/demultiplexer 1 operates as an optical multiplexer, the multiplexer/demultiplexer 1 multiplexes a light signal of $\lambda_1$ that is input to the port $12_1$ and a light signal of $\lambda_2$ that is input to the port $12_2$ into a multi-wavelength light signal including $\lambda_1$ and $\lambda_2$, and then outputs the multi-wavelength signal through the port 11. The arrow in FIG. 1 shows the direction in which the light travels when the multiplexer/demultiplexer 1 operates as an optical demultiplexer.

The multiplexer/demultiplexer 1 comprises a first diffraction grating 13a and a second diffraction grating 13b. Both the first grating 13a and the second grating 13b have diffraction surfaces that are parallel with the yz plane. These diffraction surfaces face each other. The grating directions of the first and second gratings 13a and 13b are both parallel with the z axis. The first and second gratings 13a and 13b have the same grating interval d. The optical paths between the port 11 and the ports $12_1$ and $12_2$ are parallel with the xy plane.

The first grating 13a receives a collimated multi-wavelength light signal including wavelengths $\lambda_1$ and $\lambda_2$ from the port 11. The first grating 13a diffracts the multi-wavelength light signal at angles according to the wavelengths. When the incident angle from the port 11 to the first grating 13a is $\theta_0$, the diffraction angle of the light signal of $\lambda_1$ at the first grating 13a is $\theta_1$, and the diffraction angle of the light signal of $\lambda_2$ at the first grating 13a is $\theta_2$, the following relations are established among these parameters:

$$m\lambda_1 = d(\sin\theta_0 + \sin\theta_1) \qquad (1a)$$

$$m\lambda_2 = d(\sin\theta_0 + \sin\theta_2) \qquad (1a)$$

where m is a degree of diffraction.

The second grating 13b again diffracts the light signals of $\lambda_1$ and $\lambda_2$ diffracted by the first grating 13a, and directs the light signals to the ports $12_1$ and $12_2$, respectively. Since the diffraction surfaces of the first and second gratings 13a and 13b are parallel with each other, the incident angle of the light signal of $\lambda_1$ to the second grating 13b is $\theta_1$, and the incident angle of the light signal of $\lambda_2$ to the second grating 13b is $\theta_2$. Since the grating directions of the first and second gratings 13a and 13b are the same and the grating intervals thereof are also the same, the emission angles from the second grating 13b to the ports $12_1$ and $12_2$ are both the same as the incident angle $\theta_0$ from the port 11 to the first grating 13a.

Thus, the light signal of $\lambda_1$ from the second grating 13b to the port $12_1$ and the light signal of $\lambda_2$ from the second grating 13b to the port $12_2$ travel parallel with each other. Therefore, the multiplexer/demultiplexer 1 can allow the light signals of $\lambda_1$ and $\lambda_2$ to easily and efficiently enter the ports $12_1$ and $12_2$ without sophisticated lens design and adjustment of the optical system. Furthermore, in the multiplexer/demultiplexer 1, the diffraction gratings, whose replicas can be made at low cost, are used rather than an expensive AWG. Consequently, the multiplexer/demultiplexer 1 can be manufactured at low cost.

The above description concerns the case where the light signal that is input to the port 11 is demultiplexed. When multiplexing the light signals that are input to the ports $12_1$ and $12_2$, the light travels in the reverse direction.

Second Embodiment

Figure 2:
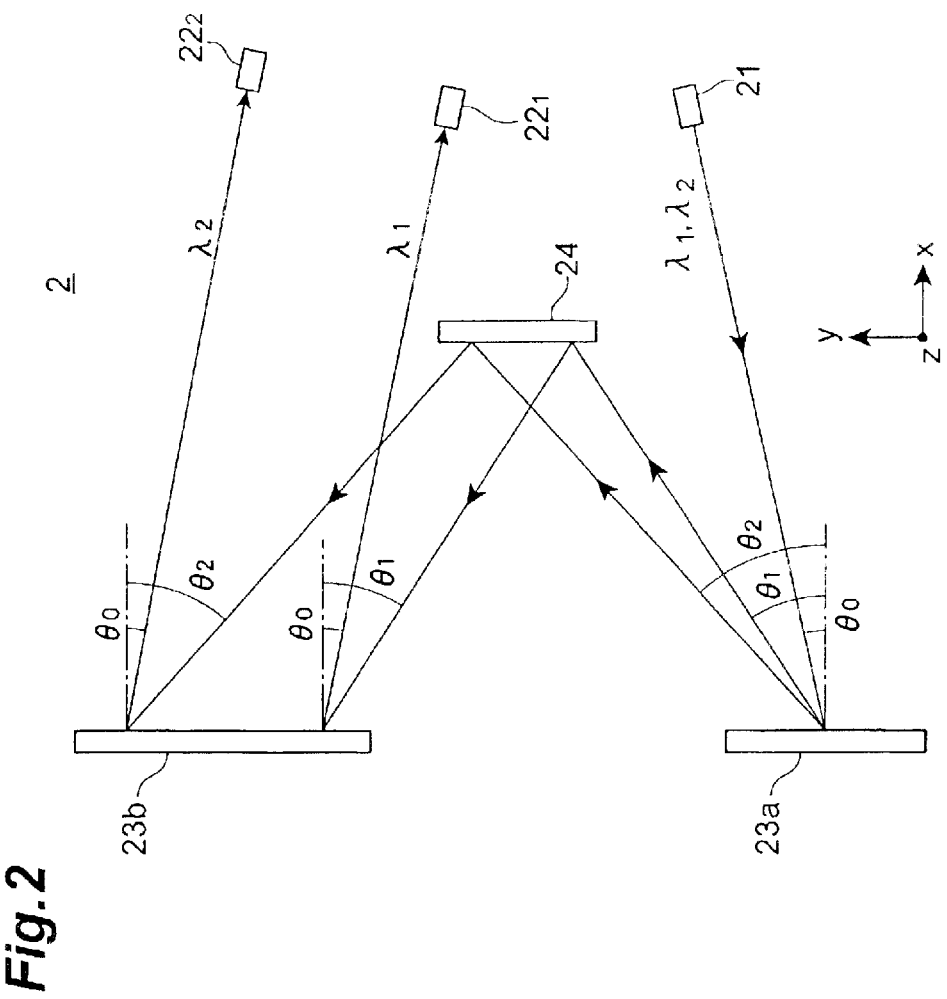
FIG. 2 is a diagram showing the configuration of an optical multiplexer/demultiplexer of the second embodiment.

The second embodiment of the optical multiplexer/demultiplexer according to the present invention will now be described. FIG. 2 is a diagram showing the configuration of the optical multiplexer/demultiplexer 2 of the second embodiment. In FIG. 2, the xyz rectangular coordinate system is also shown to assist description.

When the optical multiplexer/demultiplexer 2 operates as an optical demultiplexer, the multiplexer/demultiplexer 2 demultiplexes a multi-wavelength light signal including wavelengths $\lambda_1$ and $\lambda_2$ that is input to a port 21, and then outputs a light signal of $\lambda_1$ through a port $22_1$ and light signal of $\lambda_2$ through a port $22_2$. When the multiplexer/demultiplexer 2 operates as an optical multiplexer, the multiplexer/demultiplexer 2 multiplexes a light signal of $\lambda_1$ that is input to the port $22_1$ and a light signal of $\lambda_2$ that is input to the port $22_2$ into a multi-wavelength light signal including $\lambda_1$ and $\lambda_2$, and then outputs the multi-wavelength light signal through the port 21. The arrow in FIG. 2 shows the direction in which the light travels when the multiplexer/demultiplexer 2 operates as an optical demultiplexer.

The multiplexer/demultiplexer 2 comprises a mirror 24 in addition to a first diffraction grating 23a and a second diffraction grating 23b. The reflection face of the mirror 24 faces the diffraction surfaces of the first and second gratings 23a and 23b. Both the first and second gratings 23a and 23b have diffraction surfaces that are parallel with the yz plane. The grating directions of the first and second gratings 23a and 23b are both parallel with the z axis. The first and second gratings 23a and 23b have the same grating interval d. The optical paths between the port 21 and the ports $22_1$ and $22_2$ are parallel with the xy plane.

The first grating 23a receives a collimated multi-wavelength light signal including wavelengths $\lambda_1$ and $\lambda_2$ from the port 21. The first grating 23a diffracts the multi-wavelength light at angles according to the wavelengths. When the incident angle from the port 21 to the first grating 23a is $\theta_0$, the diffraction angle of the light signal of $\lambda_1$ at the first grating 23a is $\theta_1$, and the diffraction angle of the light signal of $\lambda_2$ at the first grating 23a is $\theta_2$, the relationships similar to the above relationships (1a) and (1b) are established among these parameters.

The mirror 24 reflects and directs the light signals of $\lambda_1$ and $\lambda_2$ from the first grating 23a to the second grating 23b. The reflection surface of the mirror 24 is parallel with the diffraction surfaces of the first and second gratings 23a and 23b. The reflectance of the mirror 24 is preferably 90% or more in a working wavelength band. In this case, the optical loss on demultiplexing and multiplexing becomes small.

The second grating 23b again diffracts the light signals of $\lambda_1$ and $\lambda_2$ diffracted by the first grating 23a and reflected by the mirror 24, and directs the light signals to the ports $22_1$ and $22_2$, respectively. Since the diffraction surfaces of the first grating 23a and the second grating 23b and the reflection surface of the mirror 24 are parallel with each other, the incident angle of the light signal of $\lambda_1$ to the second grating 23b is $\theta_1$, and the incident angle of the light signal of $\lambda_2$ to the second grating 23b is $\theta_2$. Since the grating directions of the first and second gratings 23a and 23b are the same and the grating intervals thereof are also the same, the emission angles from the second grating 23b to the ports $22_1$ and $22_2$ are both the same as the incident angle $\theta_0$ from the port 21 to the first grating 23a.

Thus, the light signal of $\lambda_1$ from the second grating 23b to the port $22_1$ and the light signal of $\lambda_2$ from the second grating 23b to the port $22_2$ travel parallel with each other. Therefore, the multiplexer/demultiplexer 2 can allow the light signals of $\lambda_1$ and $\lambda_2$ to easily and efficiently enter the ports $22_1$ and $22_2$ without sophisticated lens design and adjustment of the optical system. Furthermore, in the multiplexer/demultiplexer 2, the diffraction gratings, whose replicas can be made at low cost, are used rather than an expensive AWG. Consequently, the multiplexer/demultiplexer 2 can be manufactured at low cost.

The above description concerns the case where the light signal that is input to the port 21 is demultiplexed. When multiplexing the light signals that are input to the ports $22_1$ and $22_2$, the light travels in the reverse direction.

In this embodiment, the first grating 23a and the second grating 23b is separate from each other; however, they may be integrated together. If these gratings are integrated together, the adjustment of the optical system is even easier.

Third Embodiment

Figure 3:
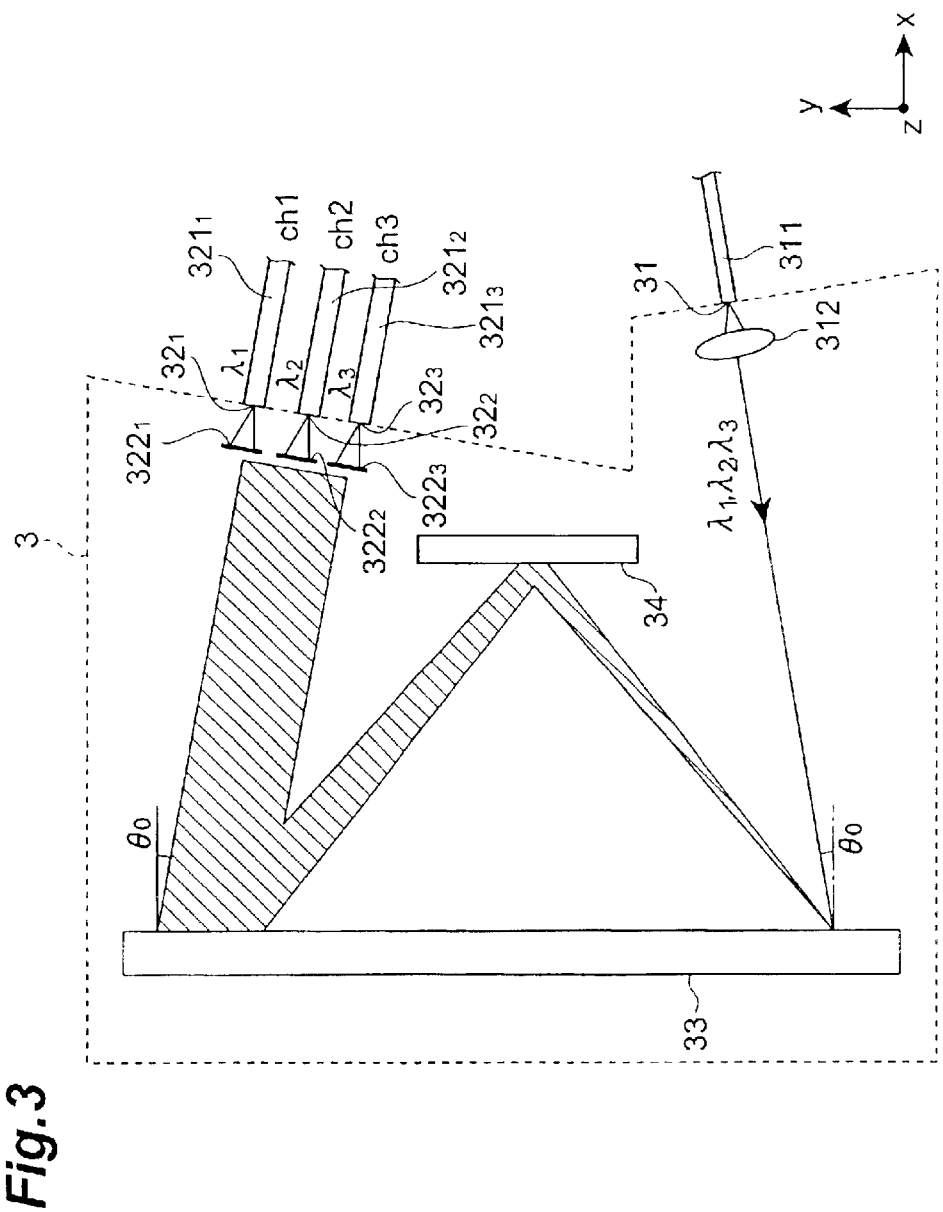
FIG. 3 is a diagram showing the configuration of an optical multiplexer/demultiplexer of the third embodiment.

The third embodiment of the optical multiplexer/demultiplexer 3 according to the present invention will now be described. FIG. 3 is a diagram showing the configuration of the optical multiplexer/demultiplexer 3 of the third embodiment. In FIG. 3, the xyz rectangular coordinate system is also shown to assist description.

When the optical multiplexer/demultiplexer 3 operates as an optical demultiplexer, the multiplexer/demultiplexer 3 demultiplexes a multi-wavelength light signal including wavelengths $\lambda_1$, $\lambda_2$ and $\lambda_3$ that is input to a port 31 via an optical fiber 311 to output a light signal of $\lambda_1$ through a port $32_1$, light signal of $\lambda_2$ through a port $32_2$, and light signal of $\lambda_3$ through a port $32_3$. Optical fibers $321_1$, $321_2$ and $321_3$ are optically coupled to the ports $32_1$, $32_2$ and $32_3$, respectively. The light signals of $\lambda_1$, $\lambda_2$ and $\lambda_3$ are sent to the optical fibers $321_1$, $321_2$ and $321_3$. The optical fibers $321_1$, $321_2$ and $321_3$ correspond to channel 1, channel 2 and channel 3 of the optical communication, respectively. When the multiplexer/demultiplexer 3 operates as an optical multiplexer, the multiplexer/demultiplexer 3 multiplexes a light signal of $\lambda_1$ that is input to the port $32_1$ via the optical fiber $321_1$, light signal of $\lambda_2$ that is input to the port $32_2$ via the optical fiber $321_2$, and light signal of $\lambda_3$ that is input to the port $32_3$ via the optical fiber $321_3$ into a multi-wavelength light signal, and then outputs the multi-wavelength signal through the port 31 to the optical fiber 311. The arrow in FIG. 3 shows the direction in which the light travels when the multiplexer/demultiplexer 3 operates as an optical demultiplexer.

The multiplexer/demultiplexer 3 is an embodiment of the present invention in which first and second gratings are integrated together. The multiplexer/demultiplexer 3 comprises a diffraction grating 33 and a mirror 34. The grating 33 has a diffraction surface that is parallel with the yz plane. The grating direction of the grating 33 is parallel with the z axis. The grating 33 has a grating interval d. The optical paths between the optical fiber 311 and the optical fibers $321_1$–$321_3$ are parallel with the xy plane.

The reflectance of the mirror 34 is preferably 90% or more in a working wavelength band. In this case, optical loss on demultiplexing and multiplexing becomes small.

A lens 312 is disposed between the port 31 and the grating 33. The lens 312 collimates the light incident from the end face of the optical fiber 311 through the port 31, and directs the light to the grating 33. The lens 312 also receives the light from the grating 33 to condense and direct the light to the end face of the optical fiber 311 through the port 31.

A lens $322_n$ is disposed between the optical fiber $321_n$ and the grating 33, where n is an integer between 1 and 3. The lens $322_n$ collimates the light incident from the end face of the optical fiber $321_n$ through the port $32_n$, and directs the light to the grating 33. The lens $322_n$ also receives the light from the grating 33 to condense and direct the light to the end face of the optical fiber $321_n$ through the port $32_n$.

The lens 312 is disposed so that the optical axis thereof forms angle $\theta_0$ with respect to the perpendicular of the diffraction surface of the grating 33. The lenses $322_1$–$322_3$ are also disposed so that the optical axes thereof form angle $\theta_0$ with respect to the perpendicular of the diffraction surface of the grating 33. The angle $\theta_0$ is an incident angle of the light from the lens 312 to the grating 33, and is also an emission angle of the light with different wavelengths from the grating 33 to the lenses $322_1$–$322_3$.

The grating 33 receives the collimated multi-wavelength light signal including wavelengths $\lambda_1$, $\lambda_2$ and $\lambda_3$ from the lens 312. The grating 33 diffracts the multi-wavelength light signal at angles according to the wavelengths, and sends the diffracted light signals of $\lambda_1$, $\lambda_2$ and $\lambda_3$ to the mirror 34. The mirror 34 reflects and directs the light signals from the grating 33 back to the grating 33. The grating 33 again diffracts the reflected light signals and directs the light signals of $\lambda_1$–$\lambda_3$ to the lenses $322_1$–$322_3$, respectively. In this embodiment, the emission angle $\theta_0$ of the light signals with different wavelengths from the grating 33 to the lenses $322_1$–$322_3$ becomes the same as the incident angle $\theta_0$ from the lens 312 to the grating 33.

Thus, the light signal of $\lambda_1$ from the grating 33 to the lens $322_1$, light signal of $\lambda_2$ from the grating 33 to the lens $322_2$, and light signal of $\lambda_3$ from the grating 33 to the lens $322_3$ travel parallel with each other. Therefore, the multiplexer/demultiplexer 3 can allow the light signals of $\lambda_1$–$\lambda_3$ to easily and efficiently enter the end faces of the optical fibers $321_1$–$321_3$ through the lenses $322_1$–$322_3$ without sophisticated lens design and adjustment of the optical system. Furthermore, in the multiplexer/demultiplexer 3, the diffraction grating, whose replicas can be made at low cost, is used rather than an expensive AWG. Consequently, the multiplexer/demultiplexer 3 can be manufactured at low cost.

The above description concerns the case where the light signal incident from the optical fiber 311 to the port 31 is demultiplexed. When multiplexing the light signals incident from the optical fibers $321_1$–$321_3$ to the ports $32_1$–$32_3$, the light travels in the reverse direction.

It is assumed that the focal distance of the lens 312 is $f_1$, the numerical aperture of the optical fiber 311 to be coupled to the lens 312 is $NA_1$, the focal distance of each of the lenses $322_1$–$322_3$ is $f_2$, and the numerical aperture of each of the optical fibers $321_1$–$321_3$ to be coupled with the lenses $322_1$–$322_3$ is $NA_2$. In this embodiment, it is preferable that the following relation is established among these parameters.

$$f_1 \cdot NA_1 < f_2 \cdot NA_2 \tag{2}$$

In this case, when the multiplexer/demultiplexer 3 is used as an optical demultiplexer, the transmission spectrum of the light of each channel from the optical fiber 311 to the optical fibers $321_1$–$321_3$ is wide and flat.

Examples of the multiplexer/demultiplexer 3 will now be described. In the first example, the beam diameter of the light collimated by the lens 312 is 0.3 mm, the focal distance $f_2$ of the lenses $322_1$–$322_3$ is 2.5 mm, and the numerical aperture $NA_2$ of the optical fibers $321_1$–$321_3$ is 0.1. The light emitted from the end face of the optical fiber 311 has a broadband including 1.55 μm wavelength. The inventors sent light condensed by the lenses $322_1$–$322_3$ into one end face of the optical fibers $321_1$–$321_3$ and measured the spectrum of the light emitted from the other end faces. The inventors also measured the spectrum of light emitted from the end face of the optical fiber 311. The inventors determined the transmission spectrum of the multiplexer/demultiplexer 3 based on these two measured spectrums.

Figure 4:
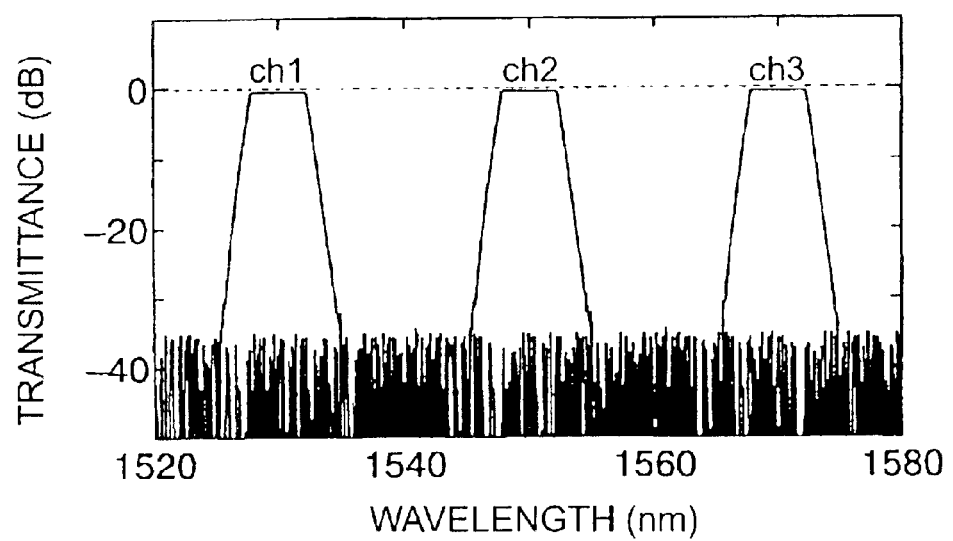
FIG. 4 shows the transmission spectrum of a first example of an optical multiplexer/demultiplexer in accordance with the third embodiment.

FIG. 4 is a diagram showing the transmission spectrum of the first example. In the transmission spectrum in FIG. 4, the transmission band of the channel 1 around the wavelength 1530 nm is a transmission band of the light that travels from the optical fiber 311 to the optical fiber $321_1$. The transmission band of the channel 2 around the wavelength 1550 nm is a transmission band of the light that travels from the optical fiber 311 to the optical fiber $321_2$. The transmission band of the channel 3 around the wavelength 1570 nm is a transmission band of the light that travels from the optical fiber 311 to the optical fiber $321_3$.

Thus, the light emitted from the end face of the optical fiber 311 is demultiplexed into three wavelengths. Since the focal distance $f_2$ of the lenses $322_1$–$322_3$ is 2.5 mm, and the numerical aperture $NA_2$ of the optical fibers $321_1$–$321_3$ is 0.1, the beam diameter of the light condensed by the lenses $322_1$–$322_3$ to enter the end faces of the optical fibers $321_1$–$321_3$ is 0.5 mm (=$2 \cdot f_2 \cdot NA_2$). This is larger than the beam diameter 0.3 mm of the light collimated by the lens 312. Therefore, the relation in the abovementioned formula (2) is satisfied. As a result, the transmission spectrum of the light of the channels 1–3, which travels from the optical fiber 311 to the optical fibers $321_1$–$321_3$, respectively, is wide and flat.

Now the second example of the multiplexer/demultiplexer 3 will be described. In the second example, the interval between the grating 33 and the mirror 34 is variable under the same conditions as the first example. As a result, the optical path length between the first and second diffraction at the grating 33 is variable. The inventors determined the transmission spectrum of the multiplexer/demultiplexer 3 for the case where the interval of the grating 33 and the mirror 34 is 20.0 mm, 19.7 mm, and 19.4 mm, respectively.

Figure 5A:
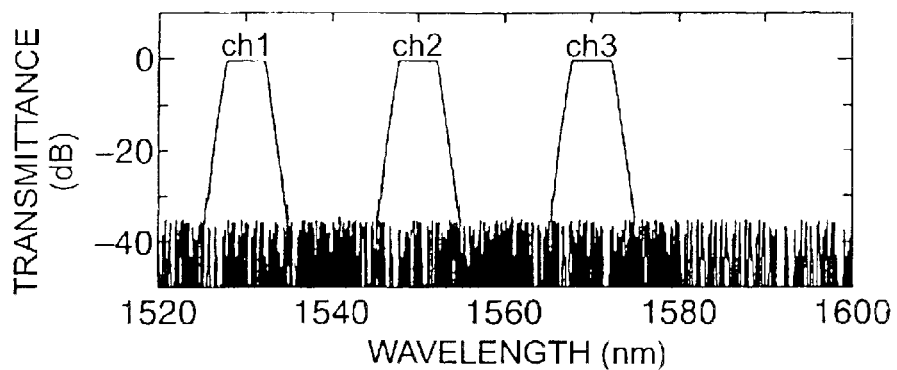
FIGS. 5A–5C show the transmission spectra of a second example of an optical multiplexer/demultiplexer in accordance with the third embodiment.
Figure 5B:
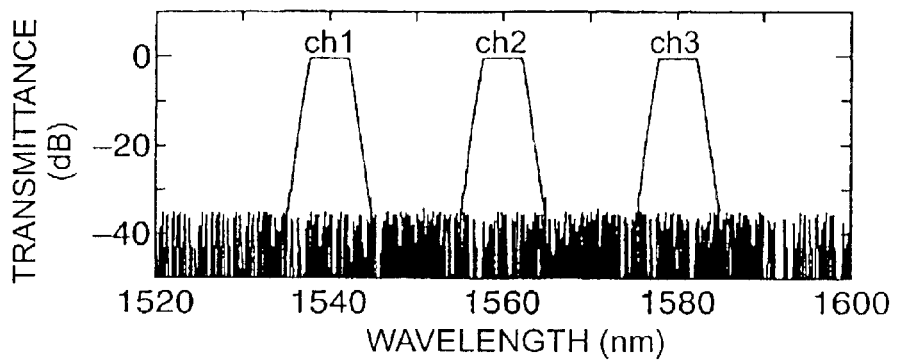
Figure 5C:
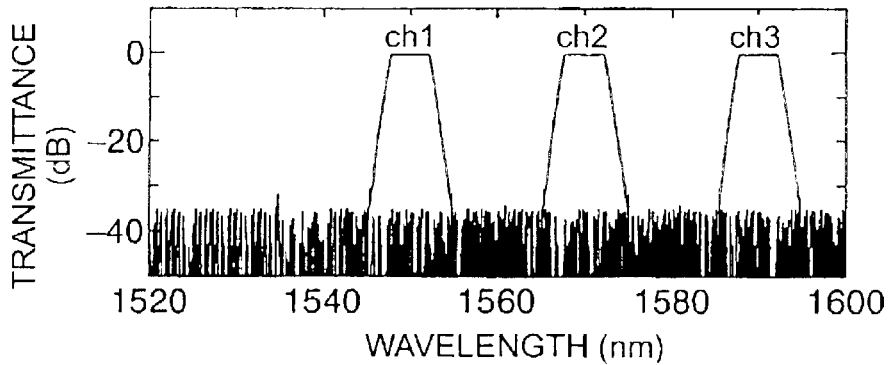

FIGS. 5A–5C are diagrams showing the transmission spectra of the second example. FIG. 5A shows the transmission spectrum when the interval is 20.0 mm, FIG. 5B shows the transmission spectrum when the interval is 19.7 mm, and FIG. 5C shows the transmission spectrum when the interval is 19.4 mm. FIG. 5A is the same as FIG. 4. As FIG. 5A shows, the transmission band of each channel shifts to the longer wavelength side as the interval between the grating 33 and the mirror 34 decreases. Thus, the transmission spectrum can be adjusted by modulating the interval between the grating 33 and the mirror 34 (that is, the optical path length between the first and second diffraction at the grating 33). Therefore, the multiplexer/demultiplexer 3 can be used as a light switch.

If there is only one set of optical fiber 321 and lens 322 at the output side, the multiplexer/demultiplexer 3 can be used as an optical filter whose transmission characteristic is variable. Also in the case of the respective positions of the optical fibers $321_1$–$321_3$ and the lenses $322_1$–$322_3$ being variable, the transmission spectrum can be adjusted.

Fourth Embodiment

Figure 6:
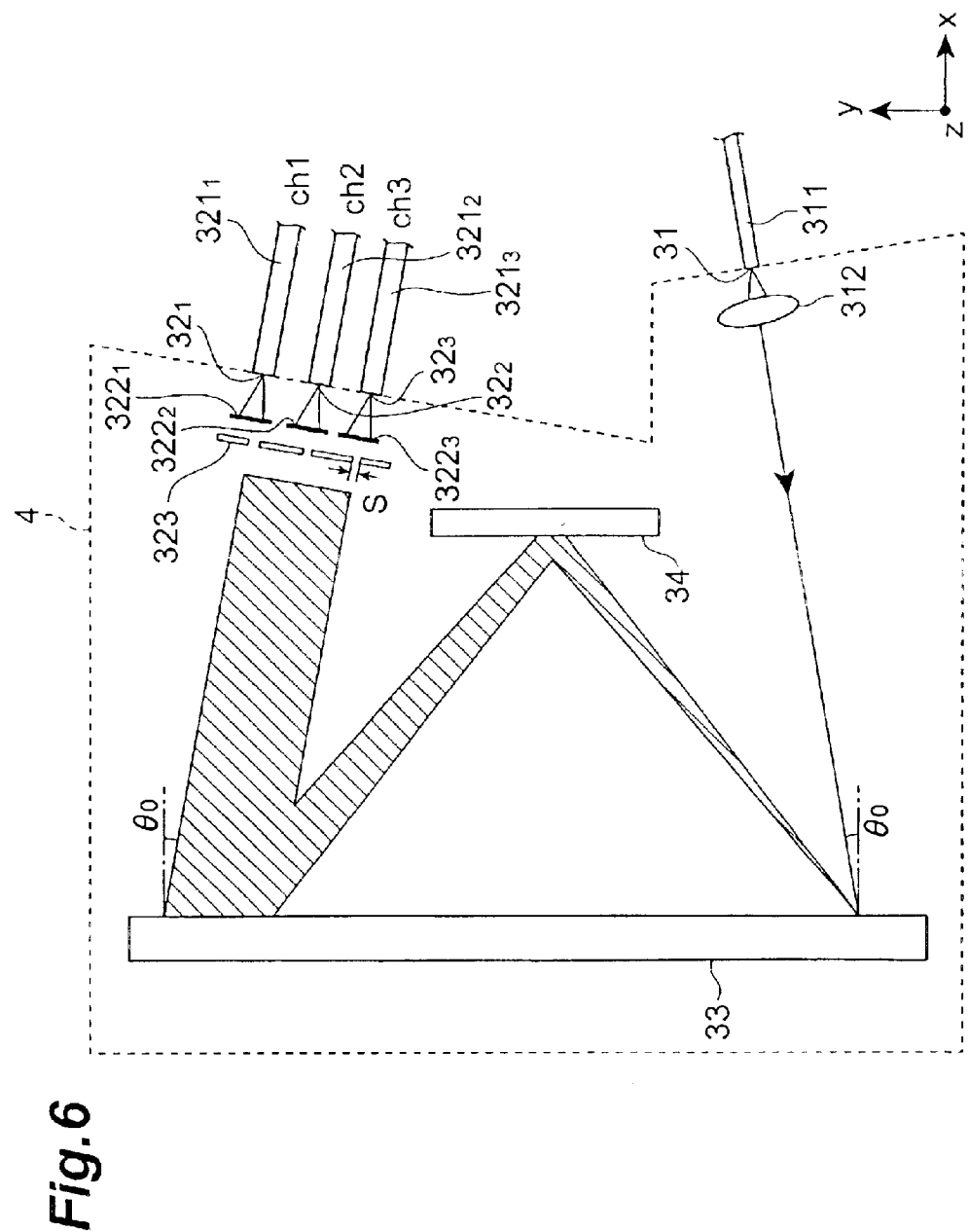
FIG. 6 is a diagram showing the configuration of an optical multiplexer/demultiplexer of the fourth embodiment.

The fourth embodiment of the optical multiplexer/demultiplexer according to the present invention will now be described. FIG. 6 is a diagram showing the configuration of the optical multiplexer/demultiplexer 4 of the fourth embodiment. In FIG. 6, the xyz rectangular coordinate system is also shown to assist description.

The optical multiplexer/demultiplexer 4 is suitable for an optical demultiplexer. The multiplexer/demultiplexer 4 demultiplexes the multi-wavelength light signal including wavelengths $\lambda_1$, $\lambda_2$ and $\lambda_3$ that is input to the port 31 via the optical fiber 311 to output the light signal of $\lambda_1$ through the port $32_1$, light signal of $\lambda_2$ through the port $32_2$, and light signal of $\lambda_3$ through the port $32_3$. The optical fibers $321_1$, $321_2$ and $321_3$ are optically coupled to the ports $32_1$, $32_2$ and $32_3$, respectively. The light signals of $\lambda_1$, $\lambda_2$ and $\lambda_3$ are sent to the optical fibers $321_1$, $321_2$ and $321_3$. The optical fibers $321_1$, $321_2$ and $321_3$ correspond to channel 1, channel 2 and channel 3 of the optical communication, respectively.

The multiplexer/demultiplexer 4 further comprises a slit device 323 in addition to the components of the multiplexer/demultiplexer 3 of the third embodiment. The slit device 323 is disposed between the grating 33 and the lenses $322_1$–$322_3$. The slit device 323 is a plate having three slits. These slits have the same shape and dimensions. These slits are located on the optical axes of the lenses $322_1$–$322_3$, respectively. When the width of each slit along the direction vertical to both the optical axes of the lenses $322_1$–$322_3$ and the z axis is S, it is preferable that the following relation is satisfied:

$$S < 2 \cdot f_2 \cdot NA_2 \qquad (3)$$

In this case, the transmission spectrum of the light of each channel from the optical fiber 311 to the optical fibers $321_1$–$321_3$ is flat. It is preferable that the slit width S is variable. In this case, the width of the transmission spectrum of the light of each channel from the optical fiber 311 to the optical fibers $321_1$–$321_3$ can be adjusted.

Figure 7:
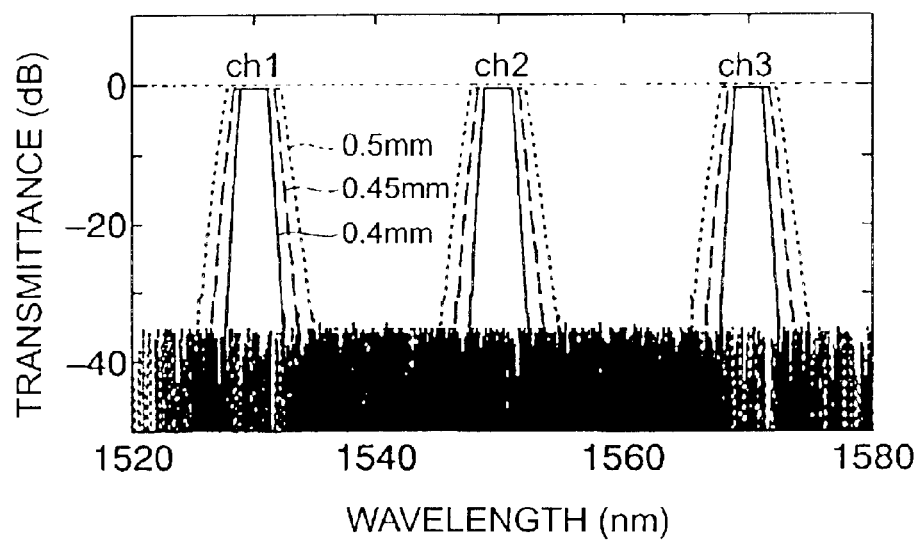
FIG. 7 shows the transmission spectrum of an example of an optical multiplexer/demultiplexer in accordance with the fourth embodiment.

Now an example of the multiplexer/demultiplexer 4 will be described. With regard to this example, the transmission spectrum was determined in cases where the slit width S is 0.50 mm, 0.45 mm, and 0.40 mm, respectively, under the same conditions as the above first example of multiplexer/demultiplexer 3. FIG. 7 shows the transmission spectra of this example. The dotted line indicates the transmission spectrum when the slit width S is 0.50 mm, the broken line indicates the transmission spectrum when the slit width S is 0.45 mm, and the solid line indicates the transmission spectrum when the slit width S is 0.40 mm. The dotted line shows the same spectrum as the one shown in FIG. 4. As FIG. 7 shows, the width of the transmission band of each channel can be adjusted by modulating the slit width S.

Fifth Embodiment

Figure 8:
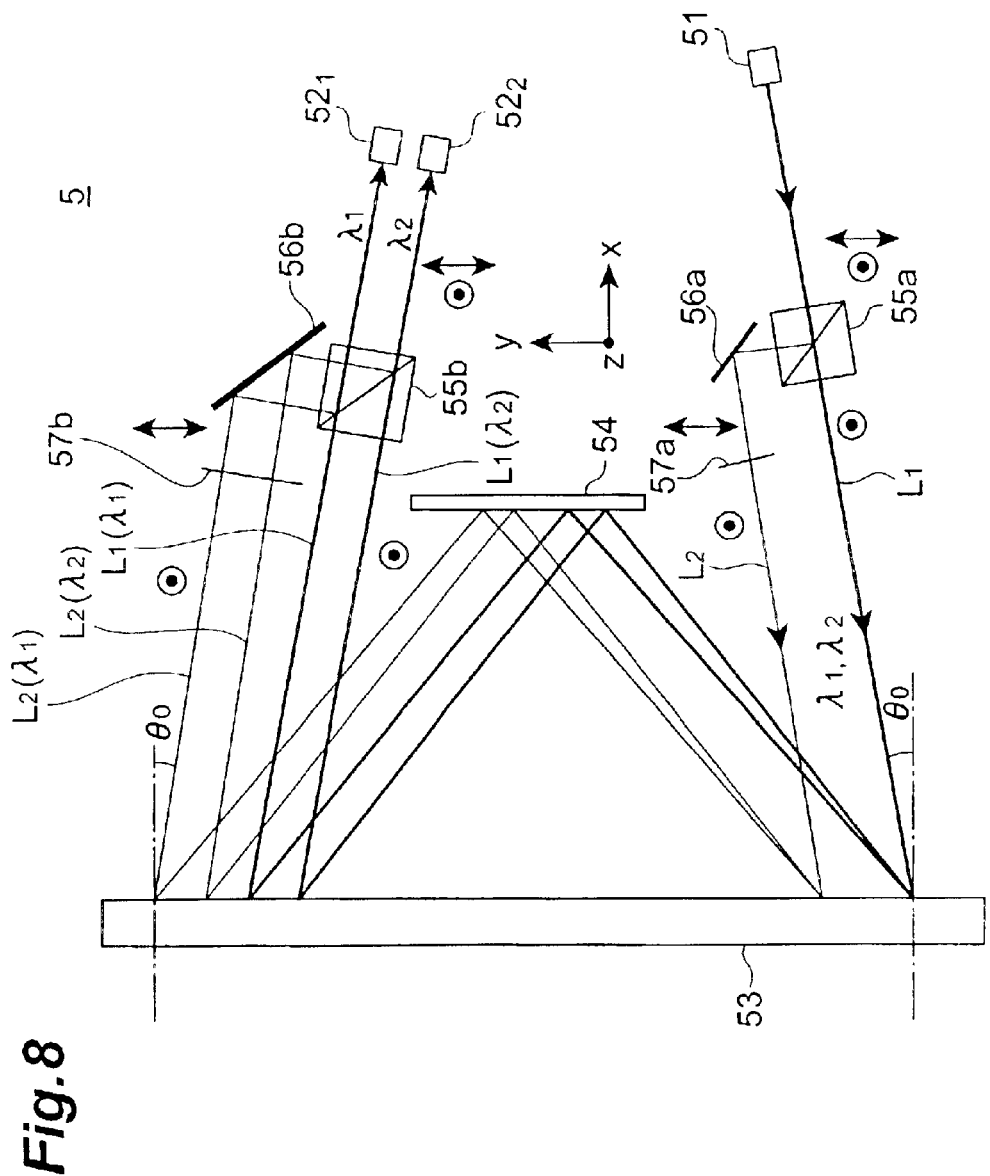
FIG. 8 is a diagram showing the configuration of an optical multiplexer/demultiplexer of the fifth embodiment.

The fifth embodiment of the optical multiplexer/demultiplexer according to the present invention will now be described. FIG. 8 is a diagram showing the configuration of the optical multiplexer/demultiplexer 5 of the fifth embodiment. In FIG. 8, the xyz rectangular coordinate system is also shown to assist description.

The multiplexer/demultiplexer 5 is an embodiment of the present invention in which first and second gratings are integrated together. The multiplexer/demultiplexer 5 comprises ports 51, $52_1$ and $52_2$, grating 53, mirror 54, polarization beam splitters 55a and 55b, mirrors 56a and 56b, and ½ wavelength plates 57a and 57b. When the multiplexer/demultiplexer 5 operates as an optical demultiplexer, the multiplexer/demultiplexer 5 demultiplexes a multi-wavelength light signal including wavelengths $\lambda_1$ and $\lambda_2$ that is input to the port 51 to output a light signal of $\lambda_1$ through the port $52_1$ and light signal of $\lambda_2$ through the port $52_2$. When the multiplexer/demultiplexer 5 operates as an optical multiplexer, the multiplexer/demultiplexer 5 multiplexes a light signal of $\lambda_1$ that is input to the port $52_1$ and light signal of $\lambda_2$ that is input to the port $52_2$ to output a multi-wavelength light signal including $\lambda_1$ and $\lambda_2$ through the port 51. The arrow in FIG. 8 shows the direction in which light travels when the multiplexer/demultiplexer 5 operates as an optical demultiplexer.

The polarization beam splitter 55a is a polarization separating element. When the multiplexer/demultiplexer 5 operates as an optical demultiplexer, the polarization beam splitter 55a polarizes and separates the incident light, i.e., the multi-wavelength light signal including $\lambda_1$ and $\lambda_2$, to emit a first light $L_1$ and second light $L_2$. The first light $L_1$ is one of the polarization components of the incident light. The first light $L_1$ is polarized in a first direction parallel with the grating direction of the grating 53, that is, polarized in the direction parallel with the z axis. The second light $L_2$ is another polarization component of the incident light. The second light $L_2$ is polarized in a second direction perpendicular to the first direction, that is, polarized in the direction parallel with the xy plane. The first light $L_1$ advances to the grating 53, and the second light $L_2$ advances to the mirror 56a.

The mirror 56a receives the second light $L_2$ from the polarization beam splitter 55a to reflect the second light $L_2$ in the same direction as the first light $L_1$ travels. The ½ wavelength plate 57a receives the second light $L_2$ reflected by the mirror 56a. The ½ wavelength plate 57a is a means for paralleling the polarization planes of the first and second light. The ½ wavelength plate 57a rotates the polarization plane of the second light $L_2$ by 90° so that the second light $L_2$ becomes polarized in the first direction.

The grating 53 receives the first light $L_1$ and the second light $L_2$, which are both polarized in the first direction. The grating 53 diffracts the first light $L_1$ and the second light $L_2$ at angles according to the wavelengths to direct the first and second light to the mirror 54. The mirror 54 reflects the first and second light $L_1$ and $L_2$ from the grating 53 so that the first and second light enters the grating 53 again. The grating 53 again diffracts the first and second light $L_1$ and $L_2$. Similar to the above embodiments, the emission angle $\theta_0$ of the light with each wavelength from the grating 53 is the same as the incident angle $\theta_0$ to the grating 53.

The ½ wavelength plate 57b receives the second light $L_2$, which is diffracted twice by the grating 53 and polarized in the first direction. The ½ wavelength plate 57b is a means for orthogonalizing the polarization planes of the first and second light $L_1$ and $L_2$. The ½ wavelength plate 57b rotates the polarization plane of the second light $L_2$ by 90° so that the second light becomes polarized in the second direction. The mirror 56 reflects and directs the second light $L_2$ from the ½ wavelength plate 57b to the polarization beam splitter 55b.

The polarization beam splitter 55b is a polarization combining means. The polarization beam splitter 55b receives the first light $L_1$, which is polarized in the first direction and diffracted twice by the grating 53, and the second light $L_2$, which is polarized in the second direction and reflected by the mirror 57b. The polarization beam splitter 55b combines the first and second light $L_1$ and $L_2$ for each of the wavelengths $\lambda_1$ and $\lambda_2$. The polarization beam splitter 55b combines the light signal of $\lambda_1$ and the light signal of $\lambda_2$ separately. Therefore, the light signal of $\lambda_1$ is sent from the polarization beam splitter 55b to the port $52_1$, and the light signal of $\lambda_2$ is sent from the polarization beam splitter 55b to the port $52_2$.

Thus, the light signal of $\lambda_1$ going from the grating 53 to the port $52_1$, and the light signal of $\lambda_2$ going from the grating 53 to the port $52_2$ travel parallel with each other. Therefore, the multiplexer/demultiplexer 5 can allow the light signals of $\lambda_1$ and $\lambda_2$ to easily and efficiently enter the ports $52_1$ and $52_2$ without sophisticated lens design and adjustment of the optical system. Furthermore, in the multiplexer/demultiplexer 5, a diffraction grating, whose replica can be made at low cost, is used rather that an expensive AWG. Consequently, the multiplexer/demultiplexer 5 can be manufactured at low cost.

In the multiplexer/demultiplexer 5, every light incident on the grating 53 is polarized in the first direction due to the operation of the polarization beam splitters 55a, 55b and ½ wavelength plates 57a and 57b. Therefore, the multiplexer/demultiplexer 5 has a stable transmission characteristic regardless of the polarization status of the input light. In other words, the multiplexer/demultiplexer 5 has a small polarization dependent loss. Also, the multiplexer/demultiplexer 5 has low loss. This is because the grating 53 can efficiently diffract light polarized in the first direction, which is parallel with the grating direction, compared with light polarized in the second direction.

The above description concerns the case where the light signal that is input to the port 51 is demultiplexed. When multiplexing the light signals that are input to the ports $52_1$ and $52_2$, the light travels in the reverse direction.

In this embodiment, as shown in FIG. 8, the wavelength plates 57a and 57b are placed on the light paths of the second light $L_2$. Therefore, the light incident on the grating 53 is polarized in the first direction. This is preferable when the grating 53 has good diffraction efficiency for light polarized in the first direction. However, the grating 53 may have better diffraction efficiency for light polarized in the second direction. In this case, the wavelength plates 57a and 57b may be placed on the light paths of the first light $L_1$ so that the incident light on the grating 53 is polarized in the second direction.

According to the configuration shown in FIG. 8, the first light $L_1$ and the second light $L_2$ advance on one plane parallel with the xy plane. In this case, the first light $L_1$ and the second light $L_2$ advance spreading in the plane whenever being diffracted. Therefore, the arrangement of the grating 53, mirror 54, polarization beam splitter 55b, mirror 56b and ½ wavelength plate 57b may be restricted. Thus, as FIG. 9 shows, it is preferable that the optical paths of the first and second light $L_1$ and $L_2$ from the polarization plane paralleling means 57a to the polarization plane orthogonalizing means 57b are shifted from each other in the grating direction of the grating 53, that is, z axis direction.

Figure 9:
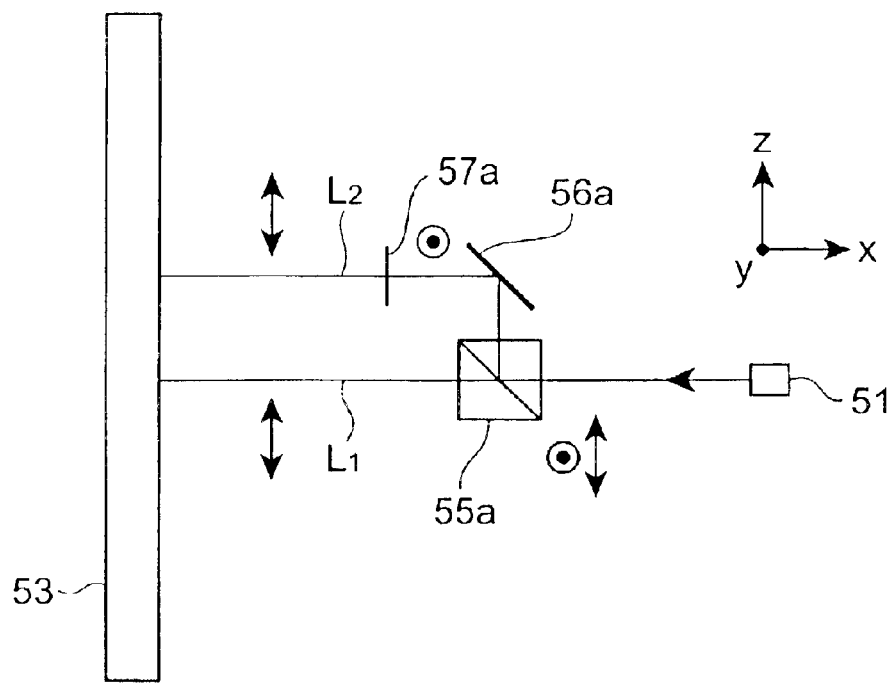
FIG. 9 is a diagram showing the configuration of a modification of the optical multiplexer/demultiplexer in accordance with the fifth embodiment.

FIG. 9 is a diagram showing the configuration of a modification of the multiplexer/demultiplexer 5. FIG. 9 shows only the configuration at the input side of the multiplexer/demultiplexer. As FIG. 9 shows, the polarization beam splitter (polarization separating element) 55a polarizes and separates the incident light to emit the first light $L_1$ in a direction parallel with the xy plane and the second light $L_2$ in a direction parallel with the z axis. The first light $L_1$ is a polarization component in the first direction parallel with the grating direction of the grating 53, that is, parallel with the z axis. The second light $L_2$ is a polarization component in the second direction perpendicular to the first direction, that is, parallel with the xy plane. The mirror 56a receives the second light $L_2$ from the polarization beam splitter 55a. The mirror 56a reflects the second light $L_2$ in the same direction as the first light $L_1$ emitted from the polarization beam splitter 55a travels. The ½ wavelength plate (polarization plane paralleling means) 57a receives the second light $L_2$ polarized in the second direction and reflected by the mirror 57a. The ½ wavelength plate 57a rotates the polarization plane of the second light $L_2$ by 90° so that the second light becomes polarized in the first direction.

The arrangement of the polarization beam splitter 55b, mirror 56b and ½ wavelength plate 57b at the output side are the same as the arrangement of the polarization beam splitter 55a, mirror 56a and ½ wavelength plate 57a at the input side, respectively. By arranging each component in this way, restriction in the arrangement of the grating 53, mirror 54, polarization beam splitter 55b, mirror 56b and ½ wavelength plate 57b is relaxed.

Figure 10:
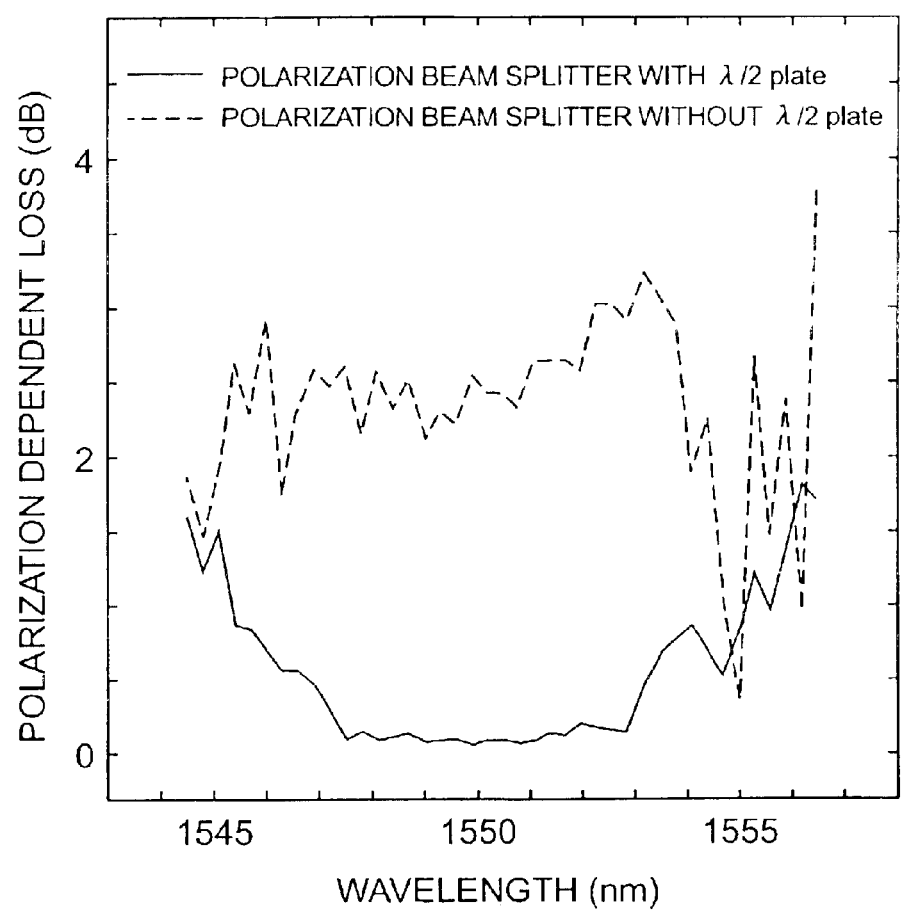
FIG. 10 is a graph showing the wavelength dependency of polarization dependent loss of the optical multiplexer/demultiplexer in accordance with the fifth embodiment and the optical multiplexer/demultiplexer in accordance with the third embodiment.

FIG. 10 is a graph showing the wavelength dependency of polarization dependent loss of the multiplexer/demultiplexer 5 in accordance with the fifth embodiment and the multiplexer/demultiplexer 3 in accordance with the third embodiment. FIG. 10 shows the polarization dependent loss in the light transmission band of the channel 2 under the same conditions as the above first example of the third embodiment. As FIG. 10 shows, the polarization dependent loss of the multiplexer/demultiplexer 3 of the third embodiment in the transmission band thereof is 2 dB or more, but the polarization dependent loss of the optical mutiplexer/demultiplexer 5 of the fifth embodiment in the transmission band thereof is about 1.1 dB, which is low.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical multiplexer/demultiplexer, comprising:
    a first port;
    one or more second ports;
    a first diffraction grating for diffracting light from said first port; and
    a second diffraction grating for diffracting light diffracted by said first grating to direct the light to said one or more second ports, said second grating being disposed parallel with said first grating and having the same grating interval and grating direction as said first grating,
    said first and second diffraction gratings being placed to demultiplex a multi-wavelength light signal incident on said first port into separate light signals with different wavelengths, and
    each of said one or more second ports being placed to receive one of the separate light signals so that said multiplex/demultiplexer outputs at least one of the separate light signals through said one or more second ports.

2. The optical multiplexer/demultiplexer according to claim 1, comprising a plurality of said second ports, wherein said multiplexer/demultiplexer multiplexes light signals with different wavelengths incident on said second ports into a multi-wavelength light signal and outputs the multi-wavelength light signal through said first port.

3. The optical. multiplexer/demultiplexer according to claim 1, further comprising a mirror disposed parallel with said first grating on an optical path between said first grating and said second grating.

4. The optical multiplexer/demultiplexer according to claim 3, wherein said first and second gratings are integrated together.

5. The optical multiplexer/demultiplexer according to claim 3, wherein the reflectance of said mirror is 90° or more in the working wavelength band.

6. The optical multiplexer/demultiplexer according to claim 1, further comprising a first lens and one or more second lenses,
    wherein said first lens is disposed on an optical path between said first port and said first grating, said first lens having an optical axis forming an angle $\theta_o$ with the perpendicular of a diffraction surface of said first grating; and
    wherein said one or more second lenses are disposed on optical paths between said second grating and said one or more second ports, said one or more second lenses having optical axes forming said angle $\theta_o$ with the perpendicular of a diffraction surface of said second grating.

7. The optical multiplexer/demultiplexer according to claim 6, wherein formula $f_1 \cdot NA_1 < f_2 \cdot NA_2$ is satisfied, where $f_1$ is a focal distance of said first lens, $NA_1$ is a numerical aperture of a first optical waveguide to be coupled with said first lens, $f_2$ is a focal distance of each of said second lenses, and $NR_2$ is a numerical aperture of one or more second optical waveguides to be coupled with said one or more second lenses.

8. The optical multiplexer/demultiplexer according to claim 6, further comprising a slit device disposed between said one or more second lenses and said second grating, wherein said slit device has one or more slits disposed on the optical axes of said one or more second lenses.

9. The optical multiplexer/demultiplexer according to claim 8, wherein the formula $S < 2 \cdot f_2 \cdot NA_2$ is satisfied, where S is a width of each slit along a direction perpendicular to both the optical axes of said one or more second lenses and grating direction of said second grating.

10. The optical multiplexer/demultiplexer, according to claim 8, wherein the slit width S is variable.

11. The optical multiplexer/demultiplexer according to claim 1, wherein an optical path length between said first and second gratings is variable.

12. The optical multiplexer/demultiplexer according to claim 1, further, comprising:
    a polarization separating element for polarizing and separating the light from said first port into first light polarized in a first direction and a second light polarized in a second direction, said first direction being parallel with the grating direction of said first grating, and said second direction being perpendicular, to said first direction;
    polarization plane paralleling means for receiving said first and second light from said polarization separating element, said polarization plane paralleling means rotating at least one of polarization planes of said first and second light to match polarization directions thereof and directing said first and second light to said first grating;
    polarization plane orthogonalizing means for receiving said first and second light from said second grating to rotate at least one of the polarization planes of said first and second light: to orthogonalize the polarization directions thereof; and
    a polarization combining element for receiving said first and second light from said polarization plane orthogonalizing means to polarize and combine said first and second light and sending the combined light to said one or more second ports.

13. The optical multiplexer/demultiplexer according to claim 12, wherein said polarization plane paralleling means rotates the polarization plane of either said first light or said second light by 90" that said first and second light, becomes polarized in the same direction.

14. The optical multiplexer/demultiplexer according to claim 12, wherein an optical path of said first light and an optical path of said second light shift in the grating direction of said first grating between said polarization plane paralleling means and said polarization plane orthogonalizing means.

15. The optical multiplexer/demultiplexer according to claim 12, wherein said polarization separating element is a polarization beam splitter.

16. The optical multiplexer/demultiplexer according to claim 12, wherein said polarization plane paralleling means is a ½ wavelength plate.

17. The optical multiplexer/demultiplexer according to claim 12, wherein said polarization plane orthogonalizing means is a ½ wavelength plate.

18. The optical multiplexer/demultiplexer according to claim 12, wherein said polarization combining element is a polarization beam splitter.

19. A method for adjusting a multiplexing/demultiplexing characteristic of an optical multiplexer/demultiplexer according to claim 10, comprising adjusting the slit width S.

20. A method for adjusting a multiplexing/demultiplexing characteristic of an optical multiplexer/demultiplexer according to claim 11, comprising adjusting the optical path length between said first and second gratings.

* * * * *